July 7, 1925.                                                    1,545,119
J. BECKER
POTATO HARVESTING MACHINE
Filed June 24, 1924

Patented July 7, 1925.

1,545,119

UNITED STATES PATENT OFFICE.

JULIUS BECKER, OF ESSEN, GERMANY, ASSIGNOR TO FRIED. KRUPP AKTIENGESELLSCHAFT, OF ESSEN-ON-THE-RUHR, GERMANY.

POTATO-HARVESTING MACHINE.

Application filed June 24, 1924. Serial No. 722,124.

*To all whom it may concern:*

Be it known that I, JULIUS BECKER, residing at Essen, Germany, a citizen of the German Republic, have invented a certain new and useful Improvement in Potato-Harvesting Machines, of which the following is a specification.

This invention relates to that class of potato harvesting machines which is provided with a lifting share and an inclined delivery wheel.

The object of the invention is to provide an arrangement for potato harvesting machines of the above type, whereby, even in the heaviest and damp ground an efficient separation of earth, leaves and potatoes is effected. This object is obtained by the fact that the axis of the delivery wheel is so inclined both to a plane which is perpendicular with relation to the direction of movement of the machine as well as to a plane lying in the direction of movement and perpendicular with relation to the ground that the delivery side of said delivery wheel is the higher one, and by the fact that there is arranged over the delivery wheel a disintegrator which rotates at a different speed to that of the delivery wheel.

Figure 1:
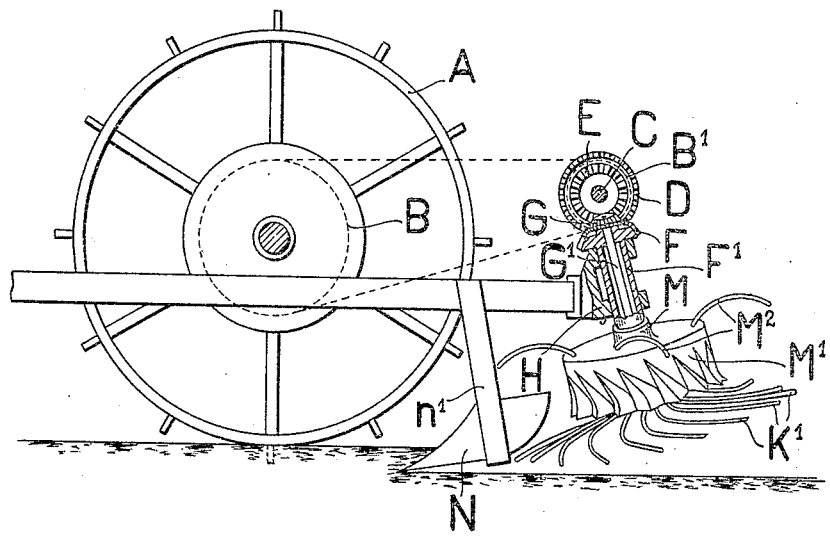
Figure 2:
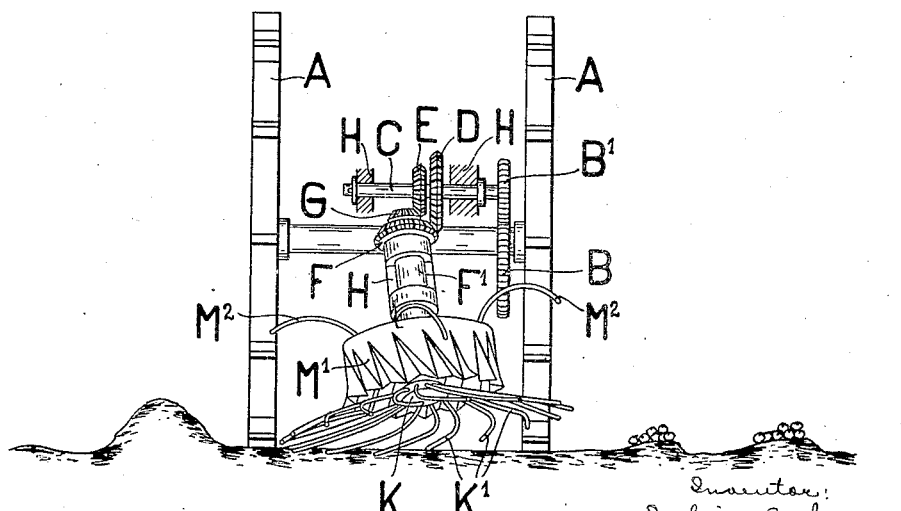

The accompanying drawing illustrates an embodiment of the subject-matter of the invention, Fig. 1 showing the potato harvesting machine in elevation, partly in section, Fig. 2 showing the right-hand rear view of Fig. 1.

A, A denote the ground wheels of the machine which drive, through the intermediary of a pair of toothed wheels B B¹, a shaft C carrying two bevel wheels D and E. The bevel wheel D is in engagement with a bevel wheel F which is fixed on a hollow shaft F¹ supported by the frame H of the machine. Mounted in this shaft F is a second shaft G¹ which carries a bevel wheel G meshing with the bevel wheel E. The shaft G¹ carries a delivery wheel consisting of a disc K and a number of curved bars K¹. Rigidly connected to the shaft F¹ is the hub M of a substantially cylindrical disintegrator M¹ which is provided at its upper surface with curved prongs M². The position of the shafts F¹ and G¹ is such that they are inclined to a plane which is perpendicular with relation to the direction of movement of the machine as well as inclined to a plane lying in the direction of movement of the machine and perpendicular with relation to the ground. At the same time, the inclination of the shafts F¹ and G¹ is chosen in such a way that the delivery side of the delivery wheel K K¹ is the higher one.

The lifting share N is fixed to the frame of the machine by means of a holder $n^1$ and its rear edge projects over the outer ends of the delivery bars K¹. The ratio of transmission between the shafts C, F¹ and G¹ is so selected that when the machine is in operation, the delivery wheel K, K¹ and the disintegrator M¹ rotate in the same direction but the disintegrator rotates more rapidly than the delivery wheel.

The working of the machine is as follows:

The dam of earth lifted by the share N and containing the potatoes is conveyed on to the delivery wheel and pressed against the disintegrator M¹. Since the latter rotates rapidly, it will disintegrate the earth and thereby separate the potatoes therefrom, which will be delivered at the side in a row by the more slowly rotating delivery wheel K K¹. The prongs M² which rotate at the same speed as the disintegrator M¹ throw the leaves outward over the row of potatoes.

By arranging the shaft of the delivery wheel inclined in two directions, as above described, the advantage is obtained that the lifted dams of earth containing the potatoes are not thrown by the delivery wheel so as to form high dams of earth with separated potatoes lying upon them, which dams steeply incline on both sides so that the harvested potatoes partly roll back into the furrow just excavated, but the dams of earth will be thrown so as to form broad but low dams on which the harvested potatoes will readily remain, see Fig. 2. While in a machine having the delivery wheel shaft inclined only in a plane perpendicular with relation to the direction of movement of the machine, it may happen that part of the harvested potatoes, viz, those rolling back into the excavated furrow, will be covered again by the laterally thrown earth when lifting the next dam of earth, all of the potatoes delivered with the machine as described will remain constantly visible so that the picking out of the potatoes is being considerably facilitated.

Claims:

1. In a potato harvesting machine having a lifting share and a delivery wheel: a disintegrator arranged over said delivery wheel, the axis of said delivery wheel being inclined both to a plane perpendicular with relation to the direction of movement of the machine as well as to a plane lying in the direction of movement and perpendicular with relation to the ground, the delivery side of said delivery wheel being the higher one.

2. In a potato harvesting machine having a lifting share and a delivery wheel: a disintegrator arranged over said delivery wheel and rotating at a different speed to that of said delivery wheel, the axis of the delivery wheel being inclined both to a plane perpendicular with relation to the direction of movement of the machine as well as to a plane lying in the direction of movement and perpendicular with relation to the ground, the delivery side of said delivery wheel being the higher one.

3. In a potato harvesting machine having a lifting share and a delivery wheel: a disintegrator arranged over said delivery wheel and rotating at a higher speed than said wheel, the axis of the delivering wheel being inclined both to a plane perpendicular with relation to the direction of movement of the machine as well as to a plane lying in the direction of movement and perpendicular with relation to the ground, the delivery side of said delivery wheel being the higher one.

The foregoing specification signed at Essen, Germany, this 28th day of May, 1924.

JULIUS BECKER